(12) United States Patent
Finkelstein

(10) Patent No.: US 10,880,920 B2
(45) Date of Patent: Dec. 29, 2020

(54) SYSTEMS, METHODS, AND APPARATUSES FOR WIRELESS SCHEDULING BASED ON DOCSIS

(71) Applicant: Cox Communications, Inc., Atlanta, GA (US)

(72) Inventor: Jeffrey L. Finkelstein, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 31 days.

(21) Appl. No.: 16/010,103

(22) Filed: Jun. 15, 2018

(65) Prior Publication Data

US 2019/0387539 A1 Dec. 19, 2019

(51) Int. Cl.
*H04W 72/14* (2009.01)
*H04W 74/08* (2009.01)
*H04W 84/12* (2009.01)

(52) U.S. Cl.
CPC ........ *H04W 72/14* (2013.01); *H04W 74/0808* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 6,438,134 B1 * | 8/2002 | Chow | ................ | H04L 12/5602 370/230 |
| 7,748,002 B1 * | 6/2010 | Beser | ................ | H04L 12/2801 718/102 |
| 2004/0246895 A1 * | 12/2004 | Feyerabend | ............ | H04L 47/29 370/229 |
| 2006/0120282 A1 * | 6/2006 | Carlson | ................ | H04L 41/147 370/229 |
| 2008/0130531 A1 * | 6/2008 | Chou | ................ | H04L 65/1069 370/310 |
| 2010/0061235 A1 * | 3/2010 | Pai | ........................ | H04L 47/10 370/230.1 |
| 2014/0105048 A1 * | 4/2014 | Tellado | ................ | H04W 24/10 370/252 |
| 2015/0055588 A1 * | 2/2015 | Yerramalli | ............. | H04L 5/005 370/329 |

(Continued)

*Primary Examiner* — Shripal K Khajuria
(74) *Attorney, Agent, or Firm* — Eversheds-Sutherland (US) LLP

(57) ABSTRACT

Embodiments of the disclosure are generally directed to systems, methods, and apparatus for wireless packet scheduling using a data over cable service interface specification (DOCSIS) medium access control (MAC) scheduler. In some embodiments, the disclosed DOCSIS MAC scheduler can be partially or fully replace a traditional wireless scheduler, for example, a WiFi scheduler defined in connection with an institute of electrical and electronics engineers (IEEE) 802.11 standard. In some embodiments, a wireless network including such a DOCSIS MAC scheduler can have several improvements over conventional wireless networks, including, but not limited to, a reduction in lost packets due to collisions, a higher channel bandwidth performance by optimizing time-for-packet transmissions, and the addition of further network capabilities including, but not limited to, provisioned-bandwidth allocation to network devices using one or more scheduler algorithms.

18 Claims, 9 Drawing Sheets

(56) References Cited

U.S. PATENT DOCUMENTS

2017/0118774 A1* 4/2017 Cariou .............. H04W 74/0816
2018/0013691 A1* 1/2018 Patrick ................ H04L 47/6215
2018/0183855 A1* 6/2018 Sabella .................. G06F 9/505
2018/0270103 A1* 9/2018 Chapman .............. H04L 1/1887
2019/0069039 A1* 2/2019 Phillips .............. H04N 21/6587

* cited by examiner

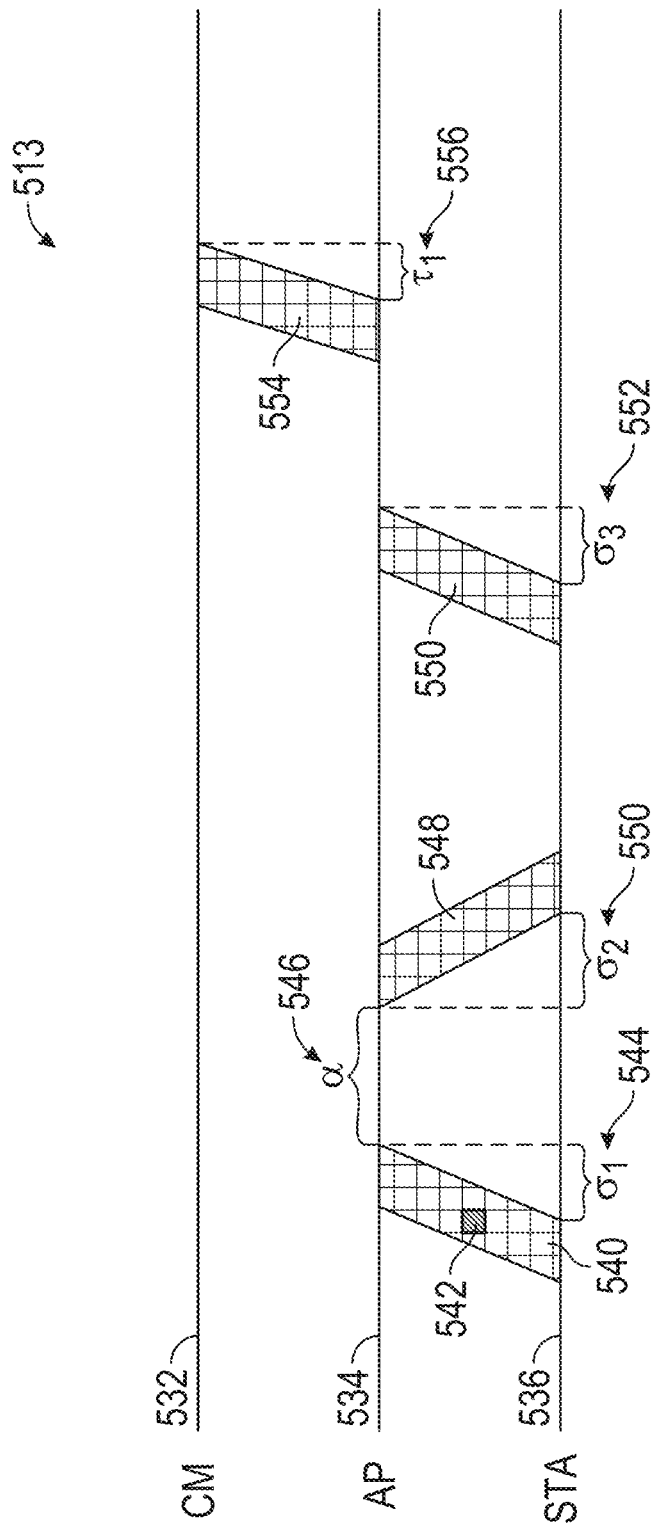

SYSTEMS, METHODS, AND APPARATUSES FOR WIRELESS SCHEDULING BASED ON DOCSIS

BACKGROUND

A variety of service providers, such as cable providers and satellite providers, may connect user devices to one or more networks, such as cable networks and/or the Internet. A provider may provide cable and/or Internet access to a residence via devices such as headends that includes a computer system and databases required for provisioning of content.

Wireless communication can operate in accordance with various standards such as Institute of Electrical and Electronics Engineers (IEEE) 802.11x, Bluetooth, global system for mobile communications (GSM), code division multiple access (CDMA), third generation partnership project (3GPP), 5th generation wireless systems (5G), and IEEE 802.11. Wireless networks based on the IEEE 802.11 wireless radio local area network (RLAN) standard, commercially known as WiFi®, Wi-Fi or WIFI, had led to availability of wireless devices and chipsets implementing various aspects of the IEEE 802.11 standards. As mobile data traffic grows and wireless devices become more abundant and diverse, wireless service providers that operate wireless networks may face significant management overhead.

BRIEF DESCRIPTION OF THE DRAWINGS

Reference will now be made to the accompanying drawings, which may not necessarily be drawn to scale, and wherein:

FIG. 5B shows another example diagram of scheduling between the different devices operating at different OSI layers, in accordance with one or more example embodiments of the disclosure;

DETAILED DESCRIPTION OF VARIOUS EMBODIMENTS

Figure 1:
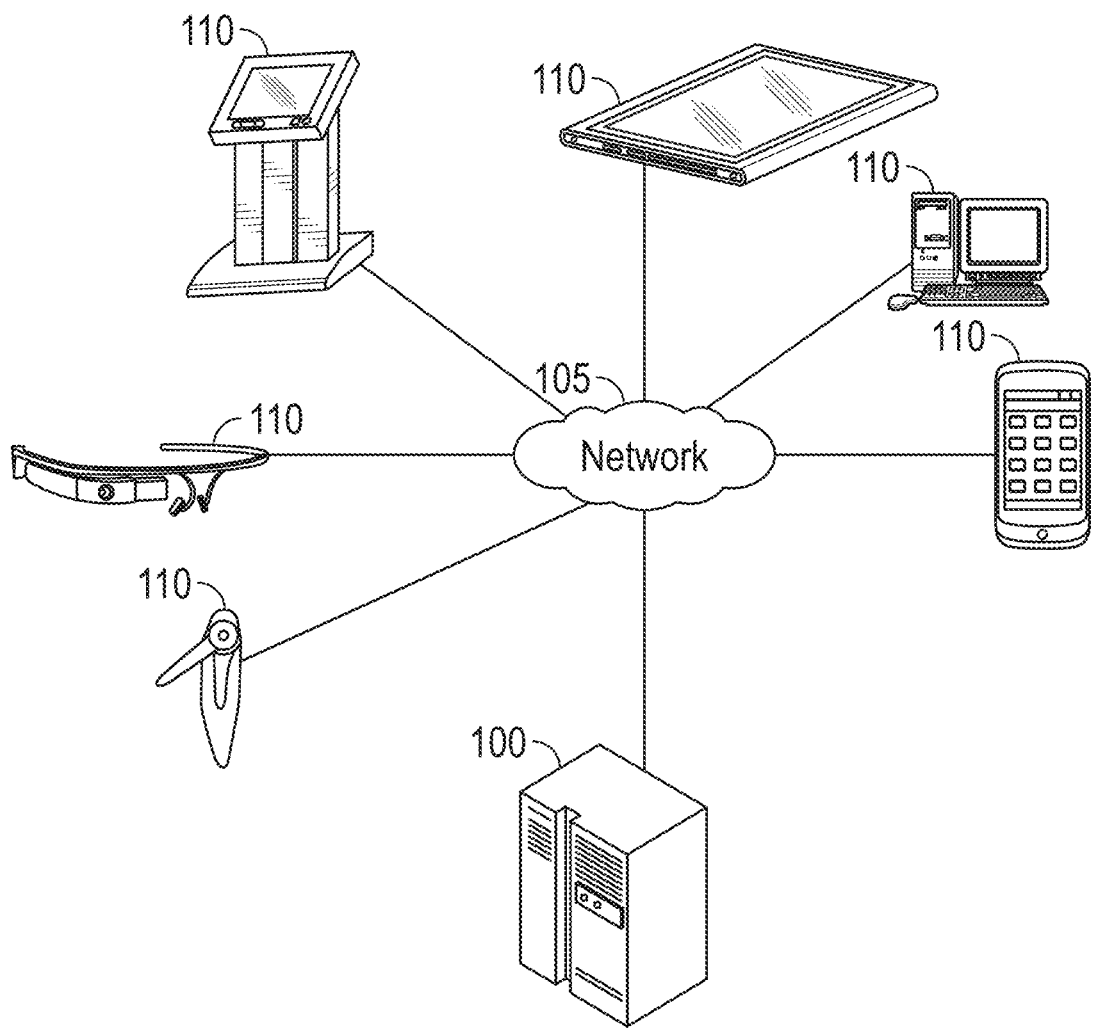
FIG. 1 shows an example schematic diagram of a system that can be used to practice embodiments of the present disclosure.

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

I. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Example System Architecture

FIG. 1 provides an illustration of an example embodiment of the present disclosure. As shown in FIG. 1, this particular embodiment may include one or more management computing entities 100, one or more networks 105, and one or more user devices 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Example Management Computing Entity

Figure 2:
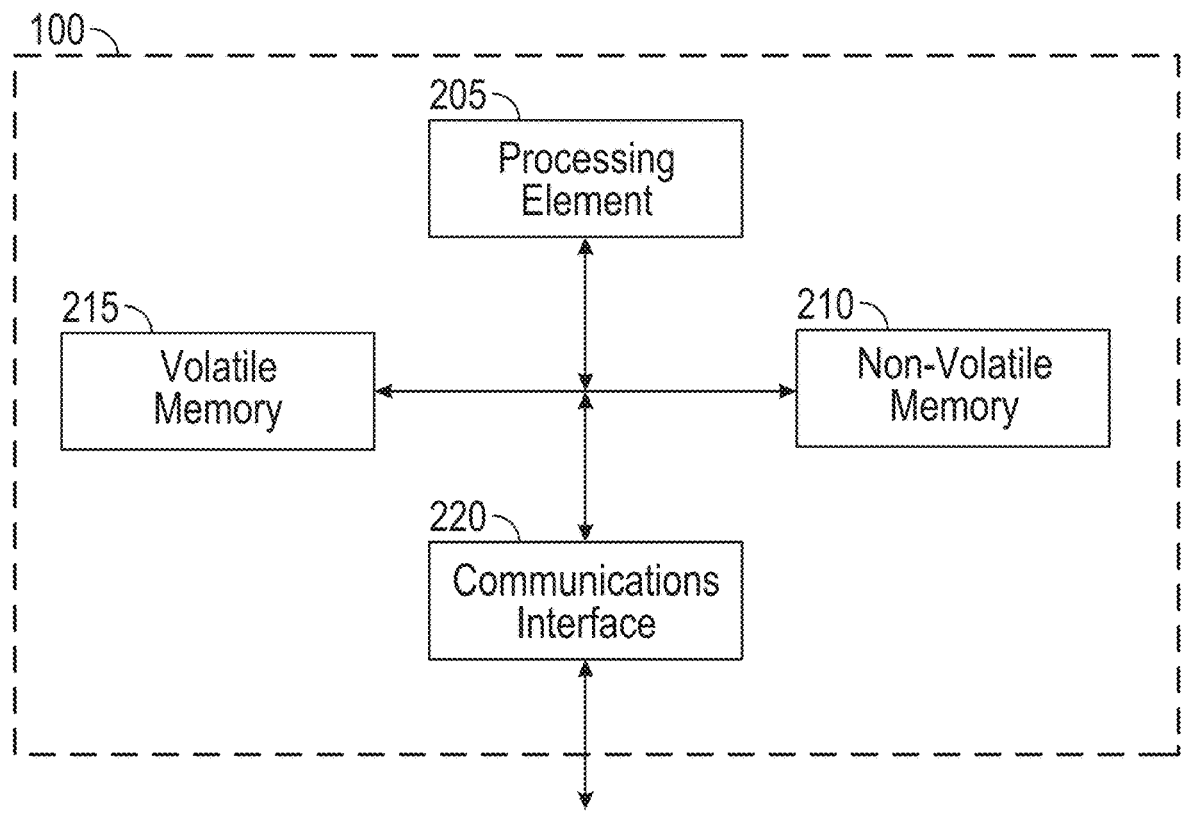
FIG. 2 shows an example schematic diagram of a management computing entity, in accordance with example embodiments of the disclosure.

FIG. 2 provides a schematic of a management computing entity 100 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for example purposes only and are not limiting to the various embodiments.

2. Example User Device

Figure 3:
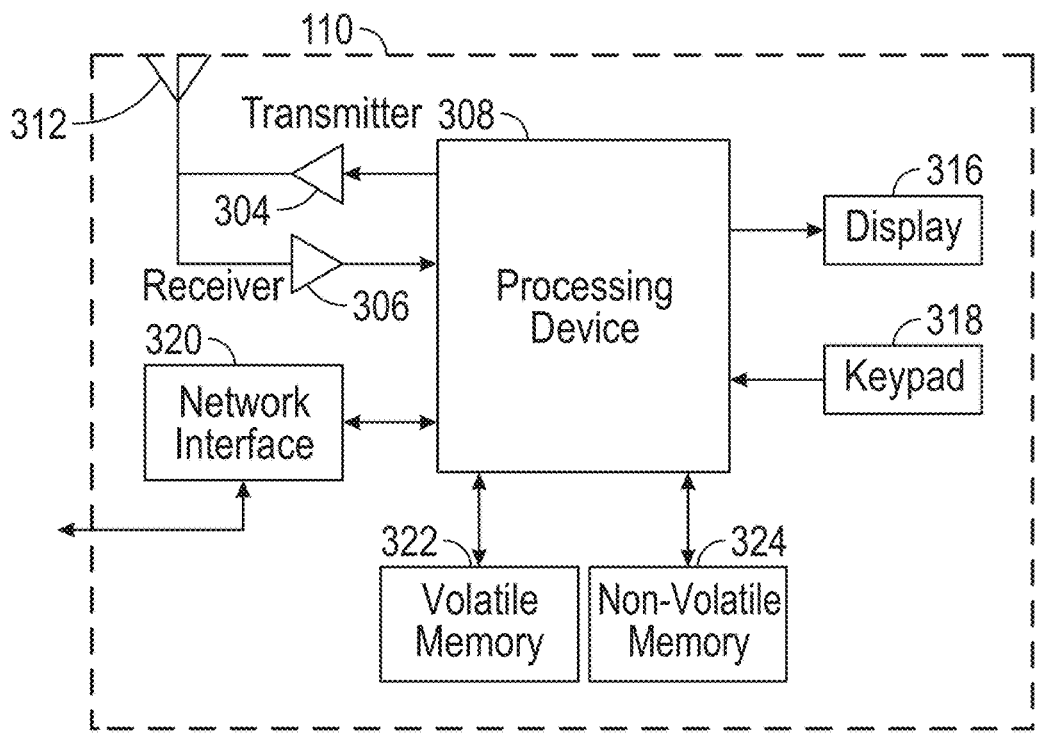
FIG. 3 shows an example schematic diagram of a user device, in accordance with example embodiments of the disclosure.

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the management computing entity 100. FIG. 3 provides an illustrative schematic representative of a user device 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (for example radio), a receiver 306 (for example radio), and a processing element 308 (for example CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the management computing entity 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the management computing entity 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (for example including executable instructions, applications, program modules), and operating system.

According to one embodiment, the user device 110 may include location determining aspects, devices, modules, functionalities, and/or similar words used herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the management computing entity 100, as described herein. The user input interface can comprise any of a number of devices or interfaces allowing the user device 110 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the user device 110 may include one or more components or functionality that are the same or similar to those of the management computing entity 100, as described in greater detail above. As will be recognized, these architectures and descriptions are provided for example purposes only and are not limiting to the various embodiments.

III. Example System Operation

In some embodiments, the medium access control (MAC) layer of conventional WiFi can use a distributed coordination function (DCF) to coordinate transmission between various wireless terminals in the network. The DCF of the IEEE 802.11 family of standards typically can use a carrier sense multiple access with collision avoidance (CSMA/CA) method for network access, wherein a WiFi terminal having data to send in a given channel may need to first monitor the channel for a predetermined amount of time to determine whether another terminal is transmitting on the channel. If the channel is clear from interference, then the terminal may be able to initiate transmission. If the channel is sensed as busy, the terminal may delay its transmission for a random duration of time. Collision avoidance can be used to improve CSMA performance by not allowing wireless transmission of a terminal if another terminal is transmitting, thus reducing the probability of collision due to the use of a random truncated binary exponential backoff time.

However, when a wireless network includes multiple access points (APs), each providing wireless access to a plurality of client terminals (herein referred to also as source (SRC) stations (STAs)), the same channels may be used by different APs in overlapping areas, the conventional WiFi MAC may become inefficient, and the transmissions may need be synchronized. Additionally, mobile devices may offer a wide range of applications. Instead of merely supporting voice and limited text-based applications, the mobile devices may run applications that utilize multimedia content such as video, which may require the processing and transmission of relatively large amounts of data. Further, some applications may be more delay-tolerant than others. For example, some business emails may be more urgent, whereas data transmissions associated with entertainment applications can be less so. Moreover, audio and video transmissions may be more affected by short delays than text-based informational applications.

In some embodiments, there can be a range of desired functionalities and resource requirements among different users and applications of a wireless network, in addition to a corresponding diversity of costs and capabilities between different network interfaces. Mobile applications may not be configured to schedule data communication nor determine multiple network interfaces to increase throughput or increase quality of service (QoS). Further, applications that schedule data communication may seek to achieve performance levels acceptable to that application in isolation, rather than improve the transmission of information over the wireless network as a whole for multiple devices and multiple applications.

In some embodiments, the term "base station" may be understood as a one or more cell sites, base stations, NodeBs, enhanced NodeBs (eNodeBs), access points (APs), and/or any terminus of radio frequency communication. The example embodiments described hereafter may also generally be applicable to architectures such as ad hoc and/or mesh network architectures for wireless networks. In another embodiment, communication from the AP to the STA can be called downlink or forward link communication. Communication from the STA to the AP can be called uplink or reverse link communication.

In various embodiments, described herein includes systems, methods, and apparatus for wireless packet scheduling using a data over cable service interface specification (DOCSIS) medium access control (MAC) packet scheduler. In some embodiments, the disclosed DOCSIS MAC scheduler can be partially or fully replace a traditional wireless scheduler, for example, a WIFI scheduler defined in connection with an institute of electrical and electronics engineers (IEEE) 802.11 standard. In some embodiments, a wireless network including such a DOCSIS MAC packet scheduler can have several improvements over conventional wireless networks, including, but not limited to, a reduction in lost packets due to collisions, a higher channel bandwidth performance by optimizing time-for-packet transmissions, and the addition of further network capabilities including, but not limited to, provisioned-bandwidth allocation to network devices using one or more scheduler algorithms.

In some embodiments, the scheduler and associated functionality can be performed in the AP. In an alternate embodiment, one or more STAs may perform scheduler functionality. In some embodiments, the AP and/or the STAs can be similar to the management computing entity 100, described above. One or more STAs may establish, through signaling, that a designated STA will perform scheduling. In this case, the designated STA can serve as the AP. The designated STA may change over time. One or more STAs or APs may have a connection to an external network, for example, a cable network. In some embodiments, an AP (or designated STA) may manage scheduling for a connection between two other STAs. In this fashion, the data transmission occurs directly between the STAs, and only the control signaling such as requests and grants can be transmitted to and received from the managing AP (or designated STA). Various configurations including these options and others will readily adapted by those of skill in the art in light of the teachings herein.

In some embodiments, the scheduler can use a channel quality estimator to determine the quality of the channel, and therefore to estimate the supportable data rate by one or more devices. When a communication device such as an STA or an AP knows the amount of data it has to send, or required duration of transmission, and the supportable data rate, the scheduler can determine the amount of resources the device needs and may determine to make a request accordingly. Those of skill in the art will recognize that there are many alternatives that may be deployed in order to determine the amount of shared resources required to transmit a known amount of data over a varying channel. As one alternative, a request for transmission may include the amount of data and a channel quality indicator. The scheduler could, in turn, make a determination of the number of symbols to grant based on these factors.

In some embodiments, the disclosure describes including DOCSIS-enabled layer-2 functionality (including scheduling functionality) of the open systems interconnection (OSI) model into a wireless controller (which can be also referred to as a wireless access controller, access point (AP), eNodeB, base station, and the like herein). In some aspects, DOCSIS can describe a scheduler that inherently includes service flows and quality-of-service (QoS) through the various functional layers of the MAC. Ethernet and other specifications may simulate such service flows, for example, with the use of virtual private networks (VPNs), tunnels, segments, and the like; however, such specifications do not necessarily provide a physical layer construct for service flows and QoS on a network as does DOCSIS. By using a DOCSIS MAC scheduler, the wireless network can have flow awareness, which may be important for advanced service flow devices with increased service complexity, for example, for Internet-of-things (IoT) devices. Accordingly, in some aspects, additional, differentiated QoS can be enabled by the disclosure as compared with a basic QoS as described in Ethernet and other wireless specifications.

In some embodiments, the disclosure enables coordination and scheduling of connectivity at the mobile communication device level to account for divergent needs of different applications running simultaneously. In another embodiment, the disclosure increases the performance of the mobile communication device and the applications deployed thereon. The disclosure can thereby reduce the complexity associated with developing scheduling algorithms for specific applications.

In some aspects, Ethernet frames may include Ethernet headers, which can include destination and source MAC addresses as the first two fields. Next, the middle section of an Ethernet frame can include payload data including any headers for other protocols (for example, internet protocol, IP) carried in the frame. The frame can end with a frame check sequence (FCS), which can be a cyclic redundancy check used to detect corruption of data. Such an Ethernet frame can be used in connection with tables to map MAC addresses and allow for a given controller device to route information. The Ethernet frame can additionally include header and/or pre-fix and post-fix sections to provide additional metadata to the devices. However, such aspects of various tunneling protocols, including, but not limited to, priority headers, differential service code points, generic routing encapsulation (GRE) protocols, multiprotocol label switching (MPLS), tunneling information, do not necessarily provide as high of a level of granularity of QoS using service flows as in DOCSIS.

In some aspects, various standards, for example, IEEE 802.11e can describe a wireless multimedia extensions (WME), also known as Wi-Fi multimedia (WMM), which can be a Wi-Fi alliance interoperability certification. In some embodiments, WME and/or WMM can provide basic quality of service (QoS) features to IEEE 802.11 networks. In some embodiments, WMM may replace aspects of Wi-Fi distributed coordination function (DCF) for carrier-sense multiple access with collision avoidance (CSMA/CA) wireless frame transmission with enhanced distributed coordination function (EDCF). EDCF, according to the WMM specifications can define access categories (AC): voice (AC_VO), video (AC_VI), best effort (AC_BE), and background (AC_BK) for the enhanced distributed channel access (EDCA) parameters that are used by a WMM-enabled station to control how long it sets its transmission opportunity (TXOP), according to the information transmitted by an AP to an STA. WMM and/or WME can be implemented for wireless QoS between RF media. In some embodiments, WME and/or WMM may be suitable for certain applications that require a lower level of QoS, such as voice over IP (VoIP) on Wi-Fi phones (VoWLAN). However, WMM and/or WME does not necessarily ensure the throughput to various network devices. In some embodiments, the disclosure is directed to systems, methods, and apparatuses for ensuring throughput to various network devices, for example, using various algorithms in accordance with a DOCSIS MAC scheduler as described herein. In some embodiments, the DOCSIS MAC scheduler as described herein can be used in addition to WME and/or WMM.

In some embodiments, the DOCSIS MAC scheduler and associated algorithms can be implemented on one or more processor and memory used in connection with an AP. In some aspects, the controller can use multiple access protocols in connection with the DOCSIS MAC packet scheduler to reduce network congestion. In some embodiments, the controller can use, for example, carrier-sense multiple access with collision avoidance (CSMA/CA) (for example, used in connection with IEEE 802.11/WiFi wireless local area networks, WLANs), ALOHA, slotted ALOHA, dynamic time-division multiple access (TDMA), reservation ALOHA (R-ALOHA), mobile slotted aloha (MS-ALOHA), code-division multiple access (CDMA), orthogonal frequency-division multiple access (OFDMA), and/or orthogonal frequency-division multiplexing (OFDM), and the like.

As mentioned, in some embodiments, scheduler algorithms can be used in connection with the WiFi DOCSIS MAC packet scheduler, for example, to reduce network congestion. In one embodiment, the scheduler algorithms can include a random early detection (RED) algorithm, also known as random early discard algorithm or random early drop algorithm for congestion avoidance. In some embodiments, RED can monitor the average queue size and drops (or marks) packets based on statistical probabilities. In some embodiments, if a buffer associated with one or more devices (for example, APs or STAs) is almost empty, then all incoming packets are accepted. As the queue grows, the probability for dropping an incoming packet can grow. When the buffer is full, the probability has reached 1 and all incoming packets may be dropped.

In one embodiment, the scheduler algorithms can include a weighted random early detection (WRED) algorithm to reduce network congestion. In some embodiments, WRED can refer to an extension of random early detection (RED) where a single queue may have several different sets of queue thresholds. Each threshold set can be associated to a particular traffic class. For example, a queue may have lower thresholds for lower priority packet. A queue buildup can cause the lower priority packets to be dropped, hence maintaining the higher priority packets in the same queue. In this way quality of service prioritization can be enabled for higher priority packets from a pool of packets using the same buffer.

In one embodiment, the scheduler algorithms can include an adaptive RED or active RED (ARED) algorithm, which can infer whether to make RED more or less aggressive based on the observation of the average queue length. In some embodiments, if the average queue length oscillates around a minimum threshold then early detection may be determined to be too aggressive. In another embodiment, if the average queue length oscillates around a maximum threshold then early detection may be determined to be too conservative. In some embodiments, the algorithm can change the probability according to how aggressively the algorithm determines it has been discarding traffic.

In one embodiment, the scheduler algorithms can include a robust random early detection (RRED) algorithm, for example, to improve the TCP throughput against Denial-of-Service (DoS) attacks. In some embodiments, a detection and filter block can be added in front of a regular RED block on a router. In some embodiments, the system can detect and filter out a DoS attack packets from incoming flows before they feed to the RED algorithm.

In one embodiment, the scheduler algorithms can include a blue algorithm. Like RED, blue can operate by randomly dropping or marking packet with explicit congestion notification mark before the transmit buffer of the network interface controller overflows. Unlike RED, however, it may need little or no tuning to be performed by the network administrator. A Blue queue can maintain a drop/mark probability and drops/marks packets with the drop/mark probability as they enter the queue. Whenever the queue overflows, the drop/mark probability can be increased by a small constant, and whenever the queue is empty, the drop/mark probability can be decreased by another constant. In some embodiments, the drop/mark probability can converge to a value that keeps the queue within its bounds with full link utilization.

Figure 4:
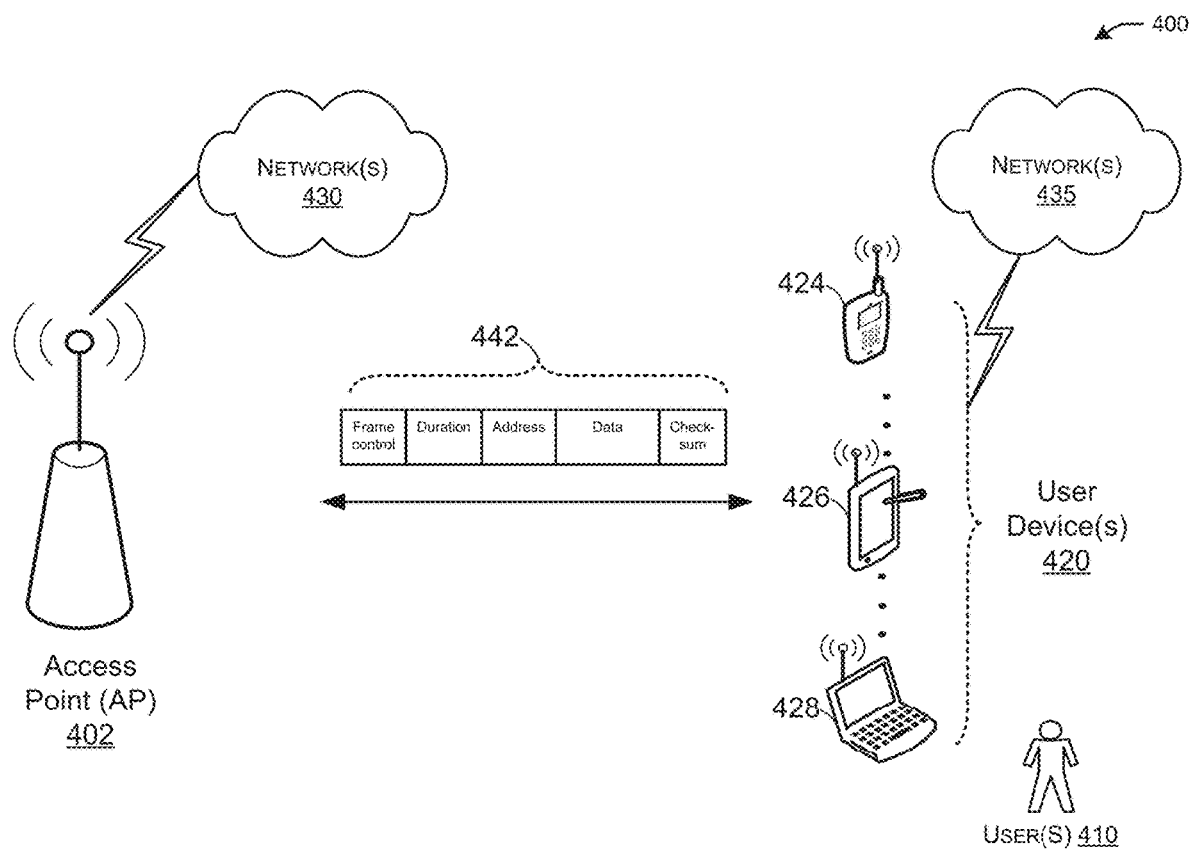
FIG. 4 is a network diagram illustrating an example network environment, according to some example embodiments of the present disclosure.

Before describing FIG. 4, certain contextual information is provided to offer an overview of QoS in a wireless network environment. In particular, wireless systems can make use of IP tunnels to provide service to attached user devices. Using tunnels, a centralized IP point of attachment (PoA) can be used that masks mobility from correspondent nodes connected to the Internet. Example tunnels that are commonly used in mobility architecture may be associated with the General Packet Radio Service (GPRS) Tunneling Protocol (GTP), Proxy Mobile IPv6 (PMIPv6), and CDMA2000 based interfaces. In some aspects, tunneled wireless interfaces can be transported over IP networks. In some instances, those IP networks may be enhanced with differentiated QoS capabilities. As an example, data over cable service interface specification (DOCSIS) access networks have been enhanced with service flow capabilities together with packet cable multimedia components to allow QoS to be applied to real-time IP flows.

In some aspects, DOCSIS can refer to an international telecommunications standard, which can facilitate the addition of high-speed data transfer to a cable system. DOCSIS may be deployed by operators to provide Internet access over, for example, hybrid fiber-coaxial (HFC) infrastructure. In some embodiments, a DOCSIS architecture can include two primary components: a cable modem (CM) located at the customer premises and a cable modem termination system (CMTS) located at the headend. Cable systems supporting on-demand programming can use a hybrid fiber-coaxial system. Fiber optic lines can bring digital signals to nodes in the system, where they can be converted into radio frequency (RF) channels and modem signals on coaxial trunk lines. A CMTS can be a device that hosts downstream and upstream ports.

In some embodiments, wireless access points can be configured to carry traffic for which certain data rate levels may be ensured. Additionally, there are certain classes of service within the traffic such that network characteristics (e.g., latency and jitter) can be accommodated by an architecture. The base station can administer higher rates of service over the air (for example, over a cellular interface). In some embodiments, the backhaul can be generally controlled by the cable modem and the CMTS.

In a given wireless deployment, the radio technology (WiFi, WiMAX, 3G, 5G, and the like) can be designed to provide QoS for services like voice, video, or specific per-subscriber service tiers. However, the standardization of such systems does not address QoS issues. Rather, QoS requirements (and delivery mechanisms) may be generally restricted to the air interface with no connections or tie-ins to layer-2 specific QoS capabilities (and delivery mechanisms).

In some embodiments, in cable network, it may be necessary that user devices have access to sufficient bandwidth in both upstream and downstream directions, for example, to ensure that the data streams are not be interrupted by pauses, gaps or other artifacts caused by a lack of necessary bandwidth. In some aspects, in HFC networks, bandwidth management may need to be additionally considered in the upstream direction, where noise is greater and available bandwidth may be less than in the downstream direction.

DOCSIS describes various mechanisms to provide communications devices (such as cable modems) with such bandwidth. In some aspects, if such bandwidth cannot be obtained or assured for future use by a given device, a signal may be passed to higher level protocols so that action can be taken (which may be, for example, to deny setup for the data transmission). In some embodiments, resource allocation for a given data stream can be made at the beginning of the data transmission or prior to the data transmission, so that once a data stream is allowed to start the user devices can have a measure of certainty that the needed bandwidth will be available for the duration of the data transmission.

In some embodiments, DOCSIS enabled devices can provide quality-of-service (QoS) through service flows. In some aspects, a service flow can refer to a flow of packets (for example, a unidirectional flow of packets) that can have been allocated a particular bandwidth, which the flow requested at the time it was initialized. Service flows can be identified by a service flow identifier (SFID), which can be assigned by a controlling device, for example, a CMTS in cable networks, or an access point (AP) in wireless networks. In some aspects, active upstream service flows can also have a unique SID.

At least two service flows can be defined in the configuration file that the modem downloads during initialization: a primary upstream service flow and a primary downstream service flow. These flows are used for subsequent unclassified traffic and MAC messages.

In some aspects, the resources required by service flows can be classified in a multi-level hierarchy. When a given device, for example, a STA creates a service flow, the requested resources can be tested (by the AP) against a provisioned authorization envelope to ensure that the request can be allowed. If so, the service flow can be authorized. In another aspect, the AP can then check to ensure that sufficient resources are available to grant the request. If so, the service flow can be admitted. Admission may ensure that the resources are available for use and can reserve the necessary resources. Admission does not necessarily grant the STA the right to use them. To do so, the service flow may need to be activated.

In some aspects, the particular QoS attributes of a service flow may be specified either by an explicit definition or by using a service class name in a request. A service class name can refer to a string that the AP can recognize to refer to a particular set of QoS parameters. In some aspects, the set of QoS parameters to which a name refers may change dynamically in response to traffic patterns on the network, allowing the AP to manage the various traffic flows passing through it.

In some aspects, using service flows can free higher-level applications from managing lower-level request frames and MAP messages. In particular, depending on the kind of flow granted, transmission opportunities may be presented to a STA without an explicit packet-by-packet request from the STA. In some aspects, a higher-level application may request bandwidth for a particular device without determining the lower-level operational details about how the packets are transmitted from the modem to its AP.

In some embodiments, the creation of a service flow may be initiated either by the STA or by the AP or the modem. In one embodiment, the creation of a service flow may be performed by a three-way handshake of MAC messages in a process that can be referred to as dynamic service addition. In one aspect, the dynamic service addition can include a DSA-request, DSA-response and DSA-acknowledge. In another aspect, changes to an existing service flow can be made through a similar series of dynamic service change (DSC) messages, and deletions of service flows occur through a two-way handshake of DSD-request and DSD-response. In some aspects, the DSA and DSC messages can facilitate fine-grained control of the bandwidth allocated to a service flow. In some aspects, the level of control may be greater than what is provided for using other WiFi standards.

When upstream bandwidth is requested, there are several mechanisms that may be used to fulfil the request. Which mechanism is chosen depends on the policy of the network operator, as well as the amount of intelligence in the CMTS and the traffic load on the upstream access network.

In some embodiments, an unsolicited grant service (UGS) flow can refer to a flow to which the AP allocates a fixed number of slots periodically to allow for a constant-bit-rate flow of information between devices. In one aspect, if the packetized output from a device comprises constant-sized packets, produced at a constant rate, UGS can be a relatively efficient method of allocating upstream bandwidth. In some embodiments, UGS can be used for telephony traffic because it may incur low maintenance traffic. In some embodiments, the STA can request, for example, n slots every m milliseconds, and the AP can grant these slots (they appear in the MAP messages) without the need for the STA to explicitly request them.

In some embodiments, a real-time polling can represent another flow that can be used. In some embodiments, the real-time polling can be similar to UGS, except that the AP can periodically give the STA an opportunity to request upstream lots to transmit queued data. If the STA has no data to transmit, it issues no request and therefore the AP can be free to reallocate those slots to another STA.

In some embodiments, UGS and real-time polling can be combined to generate a service flow operating under UGS active detection (AD). In another aspect, the service flow USG/AD can represent a flow that can be monitored by the CMTS. In another embodiment, when the AP detects a number of unused slots, the AP can revert to real-time polling until such time as the STA can begin transmitting traffic on the flow; at that time the service flow can revert to UGS.

In some embodiments, a non-real-time polling service can be utilized by the network. In some embodiments, a service flow operating under non-real-time polling can provide devices on the network some transmit opportunities even when the network is congested. In some embodiments, this service flow can represent a means to ensure that even in a congested network the STAs are can have at least some transmission opportunities.

In some embodiments, a best effort service flow can be utilized by the network. In some embodiments, in best effort service flows, the STA and AP may merely do attempt to send data when possible, with no guaranteed non-contention slots. In a highly congested network, effective data rates may be very low in best effort service flows. In some embodiments, data services may use best effort service flows. In another embodiment, if the access network is not lightly loaded, it may not be efficient for transporting telephony packets.

In some embodiments, a committed information rate service flow can be utilized by the network. In one embodiment, a committed information rate service flow can be configured as a service flow that can be delivered as best effort but may have some reserved non-real-time polling to ensure that at least some information will flow, even on a fully loaded network.

In some embodiments, dynamic service flows can be utilized by the network. In another embodiment, dynamic service flows can refer to service flows that can be created, modified or deleted by software running on a device. In a typical embodiment, a given communication between devices may be assigned to two service flows, one in the upstream direction and one in the downstream direction.

In some embodiments, a dynamic service flow can be created by a dynamic service addition request (DSA-Req). In one aspect, the STA or the AP may initiate the creation of a dynamic service flow by transmitting a DSA-Req to the other device. In some embodiments, the process for modifying a service flow is similarly performed using dynamic service change (DSC) messages and deleting a service flow by using dynamic service deletion (DSD) messages, or the like.

FIG. 4 is a network diagram illustrating an example network environment, according to some example embodiments of the present disclosure. Wireless network 400 may include one or more device 420 and one or more APs 402, which may communicate in accordance with IEEE 802.11 communication standards and work with a DOCSIS MAC scheduler, as described herein. The device(s) 420 may be mobile devices that are non-stationary and do not have fixed locations.

The user device(s) 420 (e.g., user devices 424, 426, or 428) may include any suitable processor-driven user device including, but not limited to, an STA, a desktop user device, a laptop user device, a server, a router, a switch, an access point, a smartphone, a tablet, wearable wireless device (e.g., bracelet, watch, glasses, ring, etc.) and so forth. In some embodiments, the user devices 420 and AP 402 may include one or more computer systems similar to that of the functional diagram of FIG. 6 and/or the example machine/system of FIG. 7, to be discussed further.

Returning to FIG. 4, any of the user device(s) 420 (e.g., user devices 424, 426, 428), and AP 402 may be configured to communicate with each other via one or more communications networks 430 and/or 435 wirelessly or wired. Any of the communications networks 430 and/or 435 may include, but not limited to, any one of a combination of different types of suitable communications networks such as, for example, broadcasting networks, cable networks, public networks (for example, the Internet), private networks, wireless networks, cellular networks, or any other suitable private and/or public networks. Further, any of the communications networks 430 and/or 435 may have any suitable communication range associated therewith and may include, for example, global networks (for example, the Internet), metropolitan area networks (MANs), wide area networks (WANs), local area networks (LANs), or personal area networks (PANs). In addition, any of the communications networks 430 and/or 435 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 420 (e.g., user devices 424, 426, 428), and AP 402 may include one or more communications antennae. Communications antenna may be any suitable type of antenna corresponding to the communications protocols used by the user device(s) 420 (e.g., user devices 424, 424 and 428), and AP 402. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 420.

Any of the user device(s) 420 (e.g., user device(s) 424, 426, 428), and AP 402 may include any suitable radio and/or transceiver for transmitting and/or receiving radio frequency (RF) signals in the bandwidth and/or channels corresponding to the communications protocols utilized by any of the user device(s) 420 and AP 402 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n), 5 GHz channels (e.g., 802.11n, 802.11ac), or 60 GHz channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when an AP (e.g., AP 402) establishes communication with one or more user devices 420 (e.g., user devices 424, 426, and/or 428), the AP may communicate in the downlink direction by sending data frames (e g similar to data frame 442 which can comprise various fields such as a frame control field, a duration field, an address field, a data field, and a checksum field). The data frames may be preceded by one or more preambles that may be part of one or more headers. These preambles may be used to allow the user device to detect a new incoming data frame from the AP. A preamble may be a signal used in network communications to synchronize transmission timing between two or more devices (e.g., between the APs and user devices). In some aspects, the communications may be scheduled using a DOCSIS MAC scheduler as described herein.

Figure 5A:
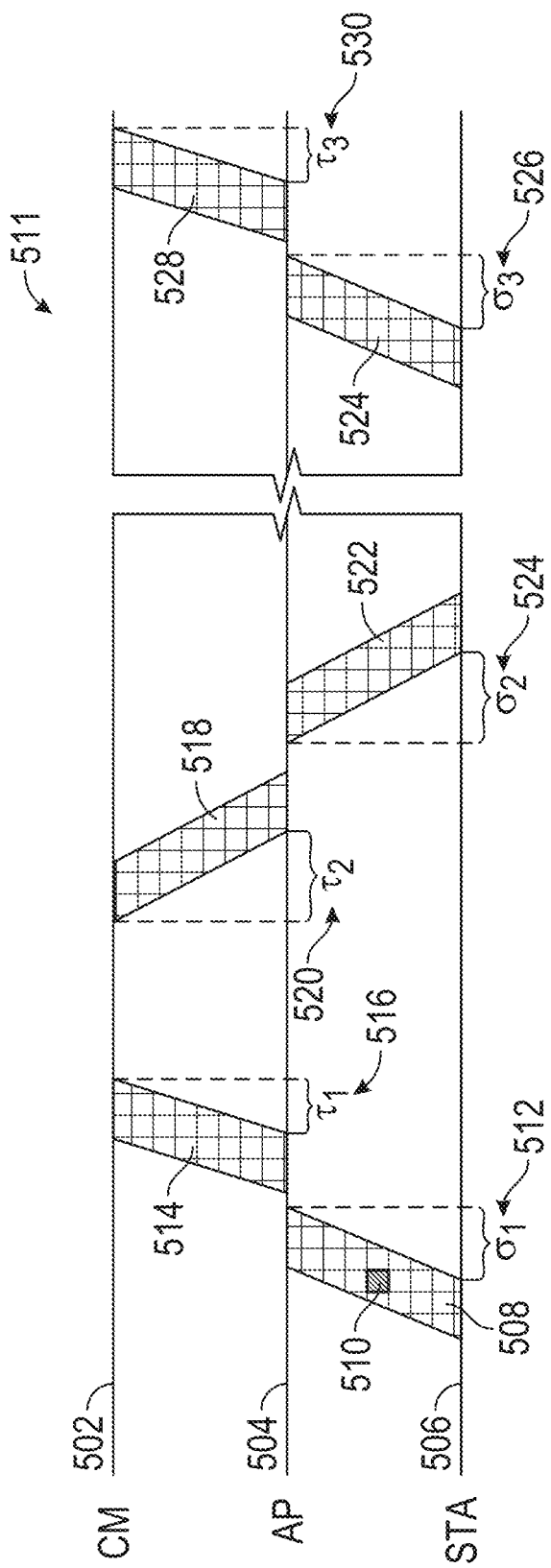
FIG. 5A shows an example diagram that shows the signaling between devices operating at different layers of the open systems interconnection (OSI) model, in accordance with one or more example embodiments of the disclosure.

FIG. 5A represents a diagram 511 that shows the signaling between different layer devices (for example a layer-1 STA, a layer-2 access point device and/or a layer-3 cable modem), in accordance with one or more example embodiments of the disclosure. In one embodiment, the cable modem device 502 may be represented by a layer 3 device. In one embodiment, the WiFi access point (AP) device 504 may be represented by a layer 2 device. In one embodiment, the source STA (or simply, STA herein) 506 may be represented by a layer-1 device.

In one embodiment, diagram 511 can represent a signaling diagram for communication between different devices. In one embodiment, the signaling diagram 511 can represent the use of a WiFi AP using a DOCSIS MAC scheduler. In one embodiment, the distance between the cable modem device 502 and the WiFi AP device 504 can lead to various delays associated with the transmission of information over the network, for example, delays on the order of approximately 5 milliseconds to approximately 10 milliseconds. In one embodiment, for gaming applications, the maximum delay that may be allowable may be less than or equal to approximately 1 millisecond to approximately 20 milliseconds. In another embodiment, for applications involving virtual reality, the associated delays may need to be less than or equal to 15 milliseconds. In one embodiment, for applications involving augmented reality, the delay may need to be less than or equal to 7 milliseconds. In one embodiment, for applications associated with 5G embodiments, the maximum delay may need to less than or equal to approximately 1 millisecond to approximately 5 milliseconds.

In one embodiment, the STA device 506 can transmit a generated packet 508 to the WiFi AP device 504. In one embodiment, the generated packet 508 may include one or more sub-packets 510. In one embodiment, there can be a propagation delay $\sigma 1$ (also referred to herein as sigma-1) 512 associated with the transmission of the generated packet 508 to the WiFi AP device 504. In one embodiment, the WiFi AP device 504 can transmit a request packet 514 to the cable modem device 502. In another embodiment, the cable modem device 502 can thereby route and/or perform any layer-3 functions on the requested packet 514. In one embodiment, there may be a network propagation delay $\tau 1$ (also referred to herein as tau-1) 516 associated with the transmission of the request packet 514 to the cable modem device 502. In one embodiment, the cable modem device 502 can transmit a grant packet 518 to the WiFi AP device 504. In an embodiment, the grant packet 518 may include any type of routing information and/or permissions associated with the grant packet and/or provided by the cable modem device 502. In one embodiment, the grant packet 518 may have an associated network propagation delay $\tau 2$ (also referred to herein as tau-2) 520. In one embodiment, the WiFi AP device 504 may take the grant packet 518 and modify it further (not shown). In one embodiment, the modified grant packet 518 may comprise an updated grant packet 522, which can be routed to one or more STA devices 506 using a modified grant packet 522. In one embodiment, the transmission of the modified grant packet 522 may have an associated propagation delay $\sigma 2$ (also referred to herein as sigma-2) 524. After a period of time, the STA device 506 can then take the results from the updated grant packet 522 and repackage it into data packet 524 for transmission to the WiFi AP device 504. In one embodiment, there may be a propagation delay $\sigma 3$ (also referred to herein as sigma-3) 526 associated with the data packet 524. In one example embodiment, the WiFi AP device 504 can take the received transmitted data packet 524 and transmit the data to the cable modem device 502 using a second data packet 528. In one embodiment, the second data packet 528 can be used in transmission over the internet. In one embodiment, there may be an associated network propagation delay $\tau 3$ (also referred to herein as tau-3) 530 associated with the transmission of the second data packet 528 from the WiFi AP device 504 to the cable modem device 502.

FIG. 5B shows another example diagram 513 of scheduling between the different layer devices, in accordance with one or more example embodiments of the disclosure. In one embodiment, the cable modem device 532 can be represented by a layer-3 device. In another embodiment, the WiFi access point (AP) device) 534 can be represented by a layer-2 device. In one embodiment, the STA device 536 can be represented by a layer-1 device.

In one embodiment, the STA device 536 can generate a packet 540 to be transmitted to the WiFi AP device 534. In another embodiment, the generated packet 540 can include a sub-packet 542. In one embodiment, the transmission of the generated packet 540 from the STA device 536 to the WiFi AP device 534 can include an associated propagation delay sigma-1 544. In one embodiment, the WiFi AP device 534 can process the received packet 540 from the STA device 536. In another embodiment, there may be an associated delay α 546 with the processing of the received packet 540 by the WiFi AP device 534. In one embodiment, the associated delay α 546 can be approximately 1 millisecond to approximately 2 milliseconds. In one embodiment, the WiFi AP device 534 can transmit a grant packet 548 to the STA device 536. In another embodiment, the grant packet 548 can include various information such as header information that includes routing information and the like that is appended by the WiFi AP device 534 to the grant packet 548. In one embodiment, the grant packet 548 may have an associated delay sigma-2 550 associated with the transmission of the grant packet 548 from the WiFi AP device 534 to the STA device 536. In one embodiment, the STA device 536 can then transmit a modified version of the grant packet, a second packet 550 from the STA device 536 to the WiFi AP device 534. In one embodiment, the transmission of the second packet 550 from the STA device 536 to the WiFi AP device 534 may have an associated propagation delay sigma-3 552. In one embodiment, the WiFi AP device 534 may then transmit data packet 554 associated with a modified version of the second packet 552 from the WiFi AP device 534 to the cable modem device 532, for example, for transmission over the Internet. In one embodiment, the transmission of the data packet 554 from the WiFi AP device 534 to the cable modem device 532 may have an associated network propagation delay tau-1 556. In an embodiment, the various delays sigma-1, sigma-2, sigma-3, and/or tau-1 may be similar, but not necessarily identical to, the delays shown and described in connection with FIG. 5A.

Figure 6:
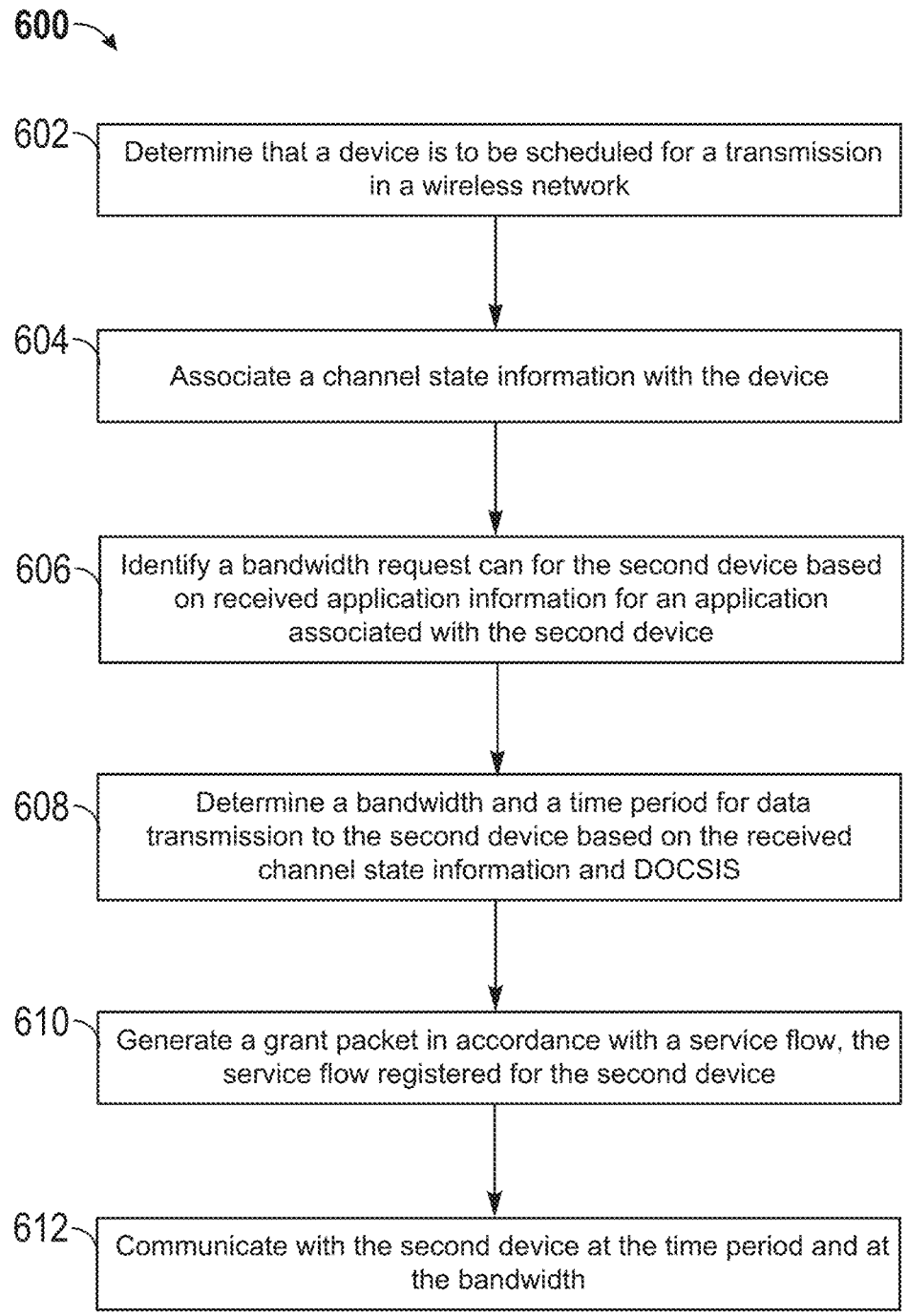
FIG. 6 shows a diagram of an example operational flow for a device in conjunction with a scheduler, in accordance with example embodiments of the disclosure.

FIG. 6 shows a diagram of an example operational flow for the device in conjunction with a DOCSIS MAC scheduler, in accordance with example embodiments of the disclosure. At block 602, a device can be determined to be scheduled for a transmission in a wireless network. In some embodiments, the wireless network can include a WiFi network. In some embodiments, the first device can include one or more of a wireless access point (AP) functionality or a cable modem functionality. In some embodiments, the AP can have a layer-2 OSI functionality.

In some embodiments, the DOCSIS MAC scheduler and associated algorithms can be implemented on one or more processor and memory used in connection with an AP. In some embodiments, the AP can be similar to the management computing entity 100, described above. In some aspects, the AP can use multiple access protocols in connection with the DOCSIS MAC packet scheduler to reduce network congestion. In some embodiments, the AP can use, for example, carrier-sense multiple access with collision avoidance (CSMA/CA) (for example, used in connection with IEEE 802.11/WiFi wireless local area networks, WLANs), ALOHA, slotted ALOHA, dynamic time-division multiple access (TDMA), reservation ALOHA (R-ALOHA), mobile slotted aloha (MS-ALOHA), code-division multiple access (CDMA), orthogonal frequency-division multiple access (OFDMA), and/or orthogonal frequency-division multiplexing (OFDM), and the like.

At block 604, a channel state information can be associated with the device. In one embodiment, channel state information (CSI) can refer to known channel properties of a communication link. This information can describe how a signal propagates from the transmitter to the receiver and represents the combined effect of, for example, scattering, fading, and power decay with distance. The CSI can make it possible to adapt transmissions to current channel conditions, which can be important for achieving reliable communication with high data rates in multi-antenna systems.

Before accessing a channel on which to transmit data, the AP or the STA may need to check if the channel is not being used by other transmitting and/or receiving devices. For example, the source device can perform this check using a contention-based protocol (CBP), a communications protocol that allows many users to use the same radio channel without pre-coordination. One example of a CBP can be a Clear Channel Assessment (CCA). The source device can determine that the channel is available by performing a CCA and obtaining a CCA status that the channel is idle.

At block 606, a bandwidth request can be identified for the second device based on received application information for an application associated with the second device. In some embodiments, the application can include a multimedia application. The bandwidth request can be included as a part of a frame in a message transmitted between the second device (an STA) and the AP.

At block 608, a bandwidth and a time period can be determined for data transmission to the second device based at least in part on the received channel state information and a data over cable service interface specification (DOCSIS). In some embodiments, the DOCSIS can include at least one of (i) a DOCSIS 1.0, (ii) a DOCSIS 2.0, (iii) a DOCSIS 3.0, (iv) a DOCSIS 3.1, or (v) a DOCSIS 3.1 full-duplex specification. In another embodiment, the determination of the bandwidth and the time period can be performed using an algorithm, the algorithm comprising at least one of a random early detection (RED) algorithm, a weighted random early detection (WRED) algorithm, an adaptive RED (ARED) algorithm, a robust random early detection (RRED) algorithm, a blue algorithm, a stochastic fair blue (STB) algorithm, or a weighted fair queuing (WFQ) algorithm.

At block 610, a grant packet can be generated in accordance with a service flow, the service flow registered for the second device. In some embodiments, the service flow can be a DOCSIS-based quality-of-service (QoS). In another embodiment, the service flow can include at least one of an unsolicited grant service (UGS) flow, a real-time polling flow, an UGS active detection (AD) flow, a non-real-time polling service, a best effort service flow, a committed information rate service flow, or a dynamic service flow. In another aspect, the service flow can be identified by a service flow identifier (SFID).

At block 612, communication with the second device at the time period and at the bandwidth can be performed. In some embodiments, the communication can be performed in accordance with one or more standards, for example, one or more Institute of Electrical and Electronics Engineers (IEEE) 802.11 standards. In some embodiments, the communication can include a transmission of data including audio, video, and information.

Figure 7:
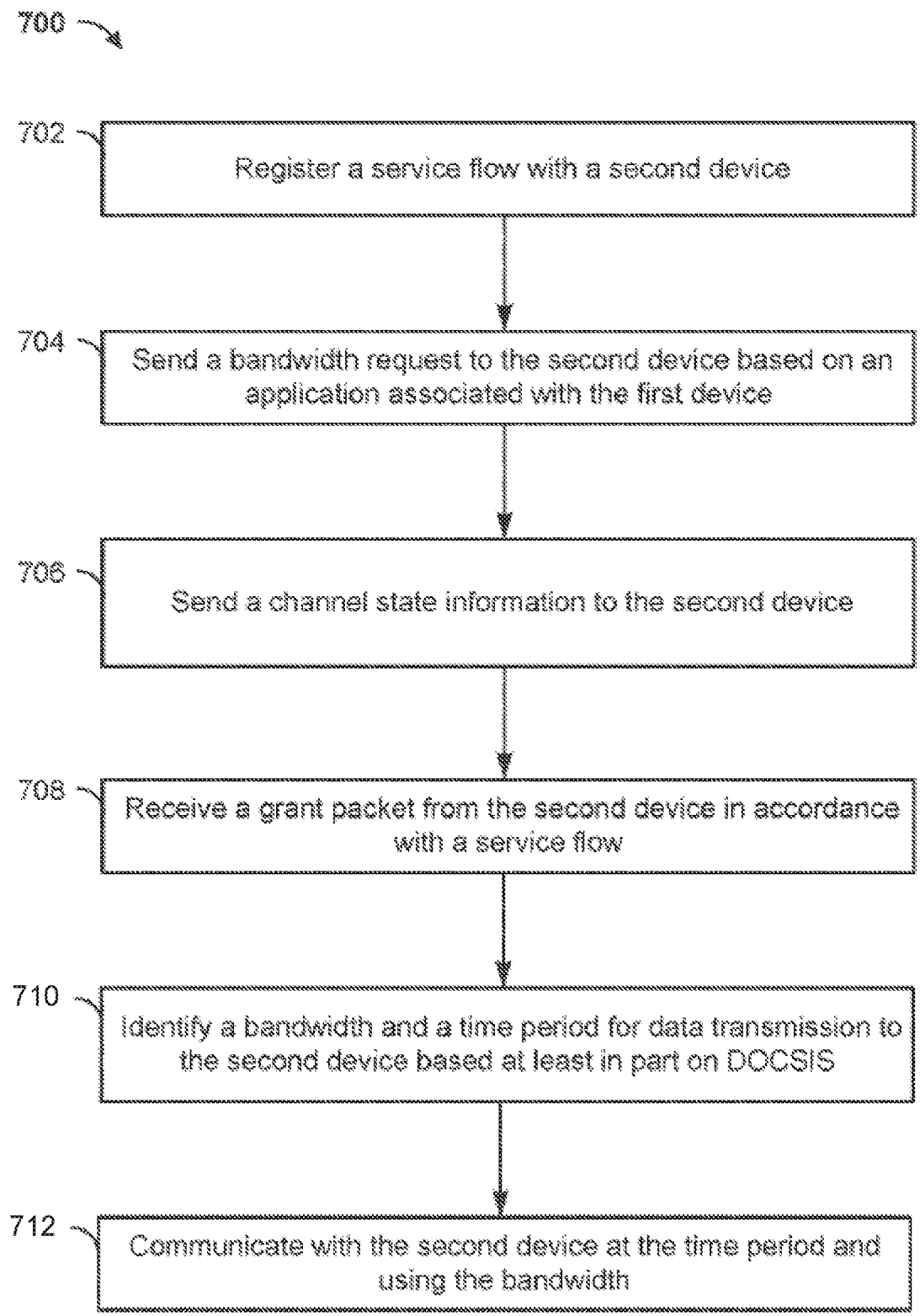
FIG. 7 shows a diagram of another example operational flow for the device in conjunction with a scheduler, in accordance with example embodiments of the disclosure.

FIG. 7 shows a diagram of another example operational flow 700 for the device operation in conjunction with a DOCSIS MAC scheduler, in accordance with example embodiments of the disclosure. At block 702, a service flow can be registered with a second device. In some embodiments, the wireless network comprises a WiFi network. In another embodiment, the service flow can be registered by a first device. In some embodiments, the first device comprises an STA. In one embodiment, the second device comprises one or more of a wireless AP functionality or a cable modem functionality. In some embodiments, the service flow comprises a DOCSIS-based quality-of-service (QoS). In some embodiments, the service flow can be based on a given application on the first device.

At block 704, a bandwidth request can be sent to the second device based on an application associated with the first device. In some embodiments, the application comprises a multimedia application. In some embodiments, the bandwidth request can be based on the data usage of the multimedia application. The bandwidth request can be included as a part of a frame in a message transmitted to the AP.

At block 706, a channel state information can be sent to the second device. In one embodiment, before accessing a channel on which to transmit data, the STA may need to check if the channel is not being used by other transmitting and/or receiving devices. For example, the source device can perform this check using a contention-based protocol (CBP), a communications protocol that allows many users to use the same radio channel without pre-coordination. For example, STA can perform a clear channel assessment (CCA). The STA can determine that the channel is available by performing a CCA and obtaining a CCA status that the channel is idle. The STA can transmit this information to the second device, i.e., the AP.

At block 708, a grant packet can be received from the second device in accordance with a service flow. In some embodiments, the service flow comprises a DOCSIS-based quality-of-service (QoS). In another embodiment, the service flow comprises at least one of an unsolicited grant service (UGS) flow, a real-time polling flow, an UGS active detection (AD) flow, a non-real-time polling service, a best effort service flow, a committed information rate service flow, or a dynamic service flow. In one embodiment, the service flow can be identified by a service flow identifier (SFID).

At block 710, a bandwidth and a time period for data transmission to the second device can be identified based at least in part on a data over cable service interface specification (DOCSIS). DOCSIS comprises at least one of (i) a DOCSIS 1.0, (ii) a DOCSIS 2.0, (iii) a DOCSIS 3.0, (iv) a DOCSIS 3.1, or (v) a DOCSIS 3.1 full-duplex specification. the identification of the bandwidth and the time period is performed using an algorithm, the algorithm comprising at least one of a random early detection (RED) algorithm, a weighted random early detection (WRED) algorithm, an adaptive RED (ARED) algorithm, a robust random early detection (RRED) algorithm, a blue algorithm, a stochastic fair blue (STB) algorithm, or a weighted fair queuing (WFQ) algorithm.

At block 712, communications with the second device at the time period and using the bandwidth can be performed. In some embodiments, the communication can be performed in accordance with one or more standards, for example, one or more IEEE 802.11 standards. In some embodiments, the communication can include a transmission of data including audio, video, and information.

Figure 8:
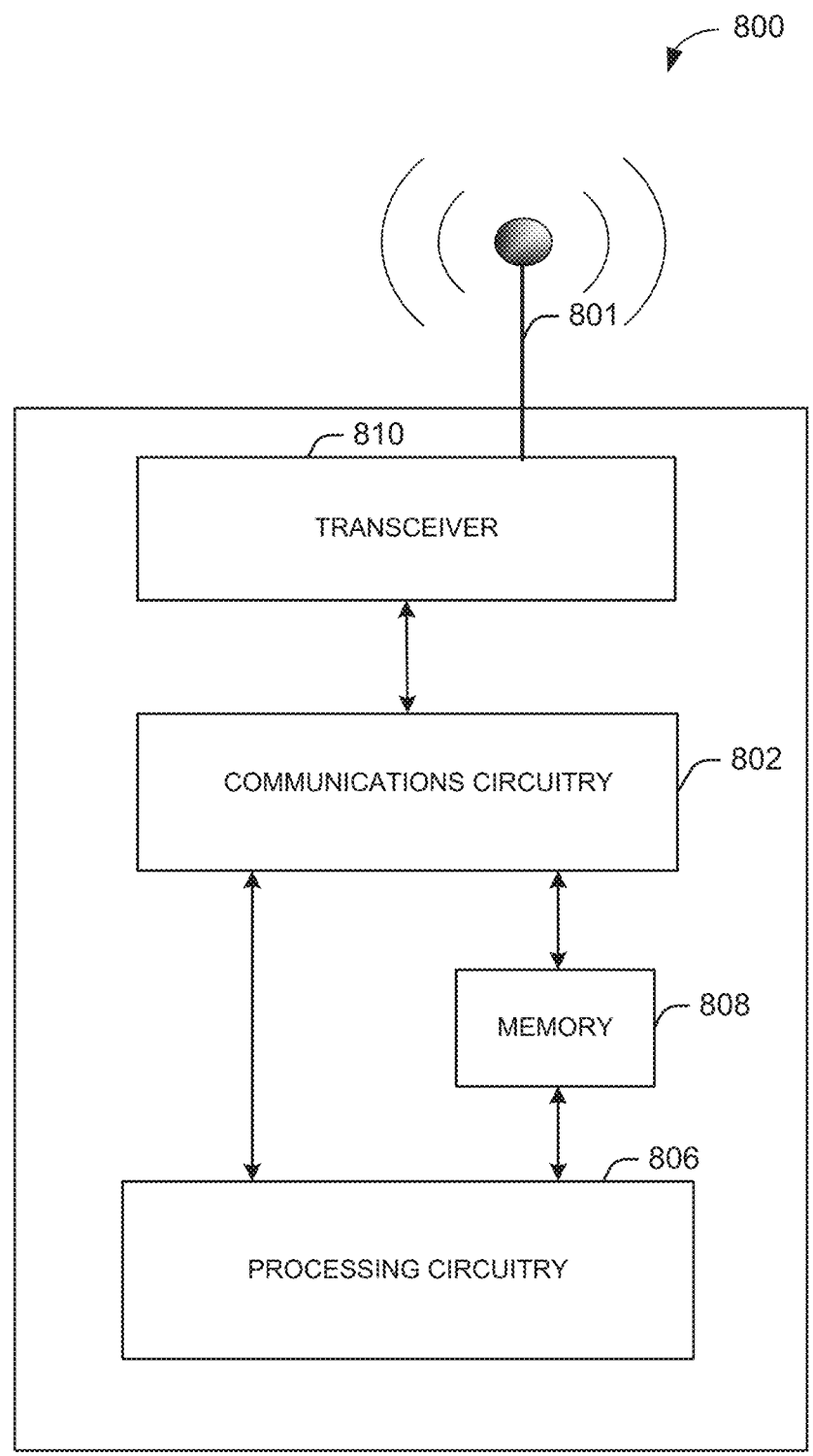
FIG. 8 shows a functional diagram of an exemplary communication station, in accordance with example embodiments of the disclosure.

FIG. 8 shows a functional diagram of an exemplary communication station 800 in accordance with some embodiments. In one embodiment, FIG. 8 illustrates a functional block diagram of a communication station that may be suitable for use as an AP 402 (FIG. 4) or communication station user device 420 (FIG. 4) in accordance with some embodiments. The communication station 800 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in FIGS. 1-7.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device may, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

Figure 9:
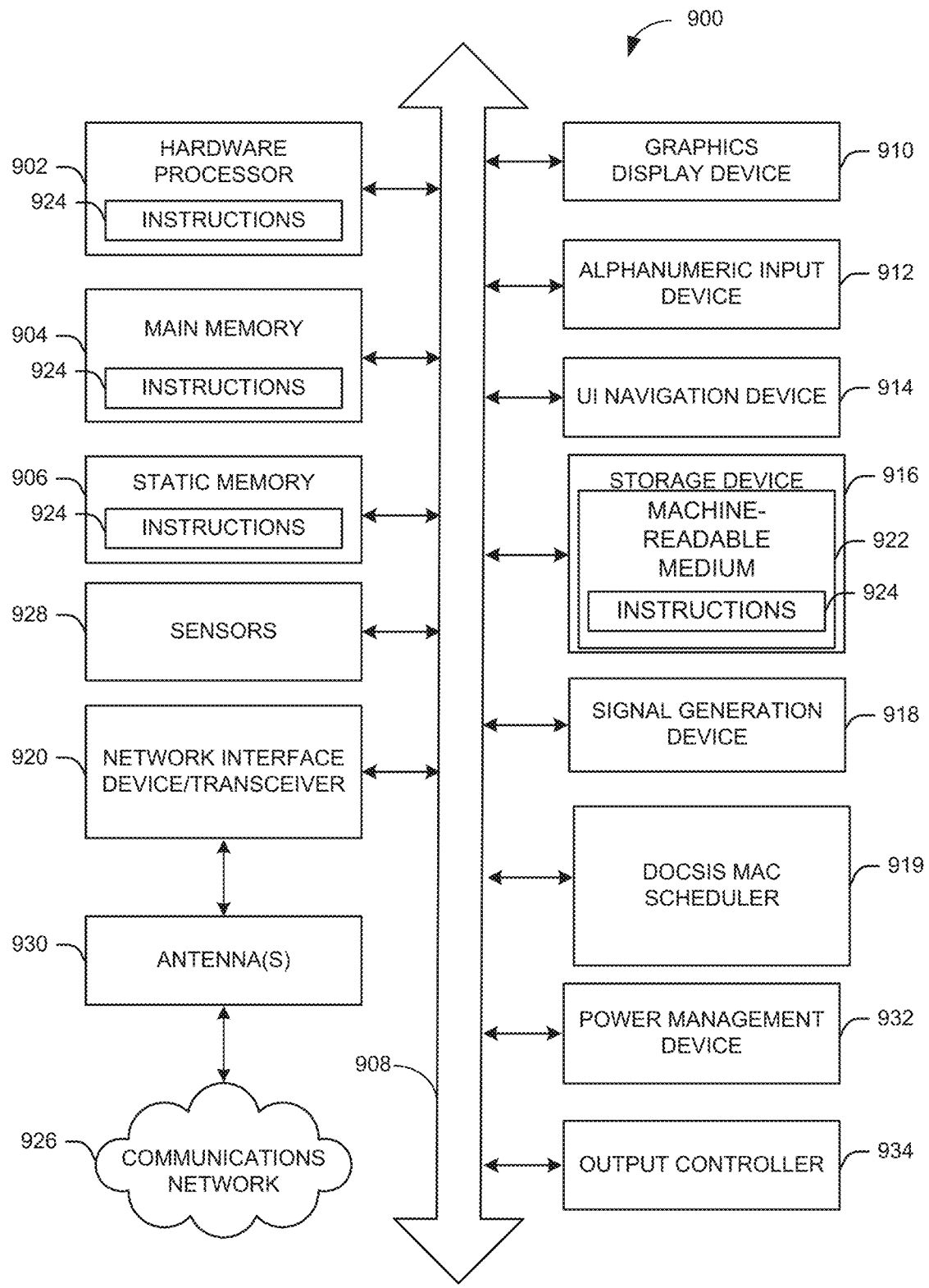
FIG. 9 shows a block diagram of an example of a machine or system upon which any one or more of the techniques (e.g., methodologies) discussed herein may be performed, in accordance with example embodiments of the disclosure.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 1000 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), a DOCSIS MAC scheduler 919, a network interface device/transceiver 920 coupled to antenna(s) 930, and one or more sensors 928, such as a global positioning system (GPS) sensor, compass, accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The DOCSIS MAC scheduler 919 may be configured to determine a second device to be scheduled for a transmission in a wireless network; determine channel state information associated with the second device; identify a bandwidth request for the second device based on received application information for an application associated with the second device; determine a bandwidth and a time period for data transmission to the second device based at least in part on the received channel state information and a data over cable service interface specification (DOCSIS); generate a grant packet in accordance with a service flow, the service flow registered for the second device; and communication with the second device at the time period and using the bandwidth.

It is understood that the above are only a subset of what the DOCSIS MAC scheduler 919 may be configured to perform and that other functions included throughout this disclosure may also be performed by the DOCSIS MAC scheduler 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software. The operations and processes described and shown above may be carried out or performed in any suitable order as desired in various embodiments. Additionally, in certain embodiments, at least a portion of the operations may be carried out in parallel. Furthermore, in certain embodiments, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments can relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

IV. Additional Embodiment Details

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

V. Conclusion

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A first device comprising a processor and memory, the first device configured to:
   determine a second device to be scheduled for a transmission in a WiFi network;
   determine channel state information associated with the second device, wherein the channel state information is associated with a propagating characteristic of a WiFi signal between the first device and the second device, the propagating characteristic representing a combined effect of two or more of scattering, fading, and power decay with distance;
   identify a bandwidth request for the second device based on received application information for an application associated with the second device;
   determine a bandwidth and a time period for data transmission to the second device based at least in part on the channel state information and a data over cable service interface specification (DOCSIS), wherein the determination of the bandwidth and the time period is based on at least one of a weighted random early detection (WRED) algorithm, an adaptive RED (ARED) algorithm, a robust random early detection (RRED) algorithm, a blue algorithm, or a stochastic fair blue (STB) algorithm;
   generate a grant packet in accordance with a service flow, the service flow registered for the second device; and
   communication with the second device at the time period and using the bandwidth.

2. The first device of claim 1, wherein the DOCSIS comprises at least one of (i) a DOCSIS 1.0, (ii) a DOCSIS 2.0, (iii) a DOCSIS 3.0, (iv) a DOCSIS 3.1, or (v) a DOCSIS 3.1 full-duplex specification.

3. The first device of claim 1, wherein the first device comprises one or more of a wireless access point (AP) functionality or a cable modem functionality.

4. The first device of claim 1, wherein the service flow comprises a DOCSIS-based quality-of-service (QoS).

5. The first device of claim 1, wherein the application comprises a multimedia application.

6. The first device of claim 1, wherein the service flow comprises at least one of an unsolicited grant service (UGS) flow, a real-time polling flow, an UGS active detection (AD) flow, a non-real-time polling service, a best effort service flow, a committed information rate service flow, or a dynamic service flow.

7. The first device of claim 1, wherein service flow is identified by a service flow identifier (SFID).

8. The first device of claim 1, wherein the algorithm further comprises at least one of a random early detection (RED) algorithm or a weighted fair queuing (WFQ) algorithm.

9. A first device comprising a processor and memory, the first device configured to:
 register a service flow with a second device, the service flow to be scheduled over a WiFi network;
 send a bandwidth request to the second device based on an application associated with the first device;
 send a channel state information to the second device, wherein the channel state information is associated with a propagating characteristic of a WiFi signal between the first device and the second device, the propagating characteristic representing a combined effect of two or more of scattering, fading, and power decay with distance;
 receive a grant packet from the second device in accordance with a service flow;
 identify a bandwidth and a time period for data transmission to the second device based at least in part on a data over cable service interface specification (DOCSIS), wherein the identification of the bandwidth and the time period is based on at least one of a weighted random early detection (WRED) algorithm, an adaptive RED (ARED) algorithm, a robust random early detection (RRED) algorithm, a blue algorithm, or a stochastic fair blue (STB) algorithm; and
 communicate with the second device at the time period and using the bandwidth.

10. The first device of claim 9, wherein the DOCSIS comprises at least one of (i) a DOCSIS 1.0, (ii) a DOCSIS 2.0, (iii) a DOCSIS 3.0, (iv) a DOCSIS 3.1, or (v) a DOCSIS 3.1 full-duplex specification.

11. The first device of claim 9, wherein the first device comprises a source (SRC) station (STA).

12. The first device of claim 9, wherein the second device comprises one or more of a wireless access point (AP) functionality or a cable modem functionality.

13. The first device of claim 9, wherein the service flow comprises a DOCSIS-based quality-of-service (QoS).

14. The first device of claim 9, wherein the application comprises a multimedia application.

15. The first device of claim 9, wherein the sending of the channel state information to the second device comprises the first device performing a clear channel assessment (CCA).

16. The first device of claim 9, wherein the service flow comprises at least one of an unsolicited grant service (UGS) flow, a real-time polling flow, an UGS active detection (AD) flow, a non-real-time polling service, a best effort service flow, a committed information rate service flow, or a dynamic service flow.

17. The first device of claim 9, wherein service flow is identified by a service flow identifier (SFID).

18. The first device of claim 9, wherein the algorithm further comprises at least one of a random early detection (RED) algorithm or a weighted fair queuing (WFQ) algorithm.

* * * * *